April 11, 1967     T. F. ROTHWELL     3,313,315
WATER MAIN SERVICE VALVE
Filed Jan. 7, 1964
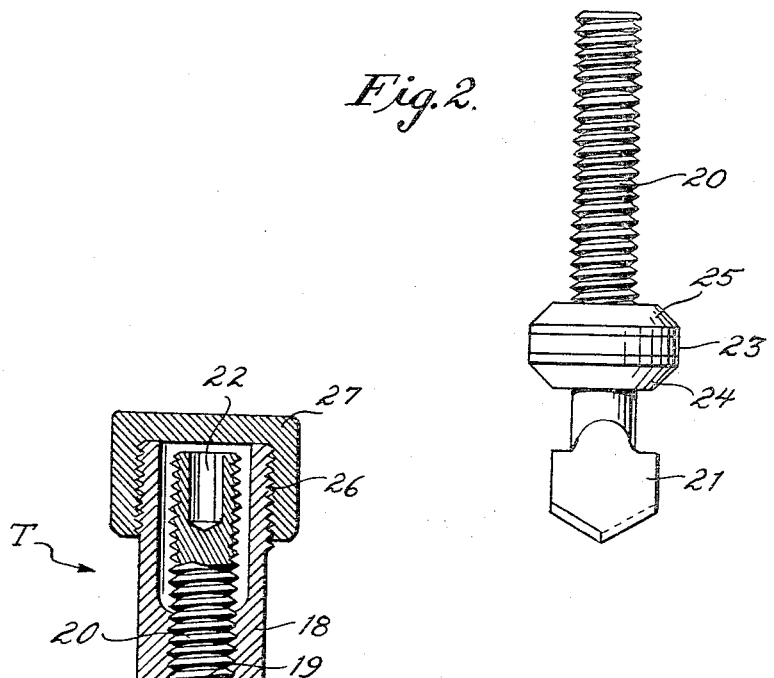
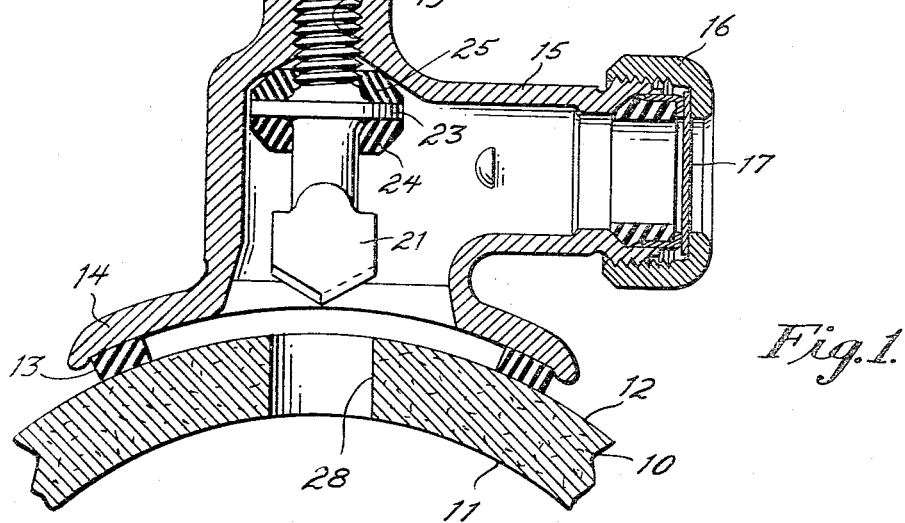
INVENTOR.
THOMAS F. ROTHWELL
BY
ATTORNEY.

United States Patent Office 3,313,315
Patented Apr. 11, 1967

3,313,315
WATER MAIN SERVICE VALVE
Thomas F. Rothwell, Bradford, Pa., assignor to Dresser Industries, Inc., Dallas, Tex., a corporation of Delaware
Filed Jan. 7, 1964, Ser. No. 336,159
3 Claims. (Cl. 137—318)

The present invention relates to the tapping valve that is commonly employed in tapping water mains and is concerned primarily with a novel gasket arrangement that is utilized to seal either the formed hole in the main or the passage which receives the tapping tool.

At the present time cement asbestos pipe is coming into widespread use as water mains. When a new customer is to be supplied from a main, it is common practice to tap the main at a desired point without interrupting service. A tapping tool is employed for this purpose and such a tool ordinarily includes a bit which cuts a hole in the main with a rotary motion. After the hole is formed, it is imperative that it be sealed until the connection to the house is connected. Heretofore seals have been provided for such a purpose but in the known devices, such seals have been a fixed part of the tapping casing. An important object of the present invention is to provide a tapping valve of the type noted, in which the gasket which seals the formed hole in the water main is carried by and moves with the tapping tool.

A tapping valve of the type with which this invention is concerned ordinarily comprises a casing having a flanged base that is secured to the water main by a stirrup. This casing also has a radial passage which receives the tapping tool and a lateral extension at the inner end of this passage for effecting the house connection. It is important that the inner end of the radial passage be sealed after the house connection is made and the water flowing from the formed hole to the house connection.

An important object of the present invention is to provide a gasket for sealing the inner end of the radial passage and which gasket is carried by and moves with the tapping tool.

It is evident that the formed hole in the water main is sealed at one time and the inner end of the radial passage at another. This condition lends itself to the use of a gasket retaining means on the tapping tool which secures both gaskets in position. Thus, another important object of the invention is to provide in a water main tapping valve a tapping tool provided with gasket carrying means together with a pair of gaskets carried by said means.

In a preferred form of the invention, the gasket carrying means takes the form of an annular flange integral with the tool with a gasket on each side of said flange. As the tool is moved downwardly in the main penetrating operation, the lowermost gasket is moved into position to seal the formed hole. As the tool is withdrawn from the formed hole the lowermost gasket is retracted from its sealing position and the uppermost gasket moved into position sealing the inner end of the radial passage.

Various other more detailed objects and advantages of the invention such as arise in connection with carrying out the above noted ideas in a practical embodiment will in part become apparent and in part be hereinafter stated as the description of the invention proceeds.

The invention therefore comprises a water main tapping valve including a tapping tool having gasket retaining means and a pair of gaskets retained in position on the tool by said means, one of said gaskets being adapted to seal the formed hole in the main and the other to seal the inner end of the radial passage.

For a full and more complete understanding of the invention, reference may be had to the following description and accompanying drawings, wherein:

FIGURE 1 is a section view of the tapping valve of this invention as mounted on a cement asbestos water main, and FIGURE 2 is a detailed view of the tapping tool per se.

Referring now to the drawing and first more particularly to FIGURE 1, a portion of the cement asbestos water main is represented at 10. The main 10 has a bore 11 and an outer cylindrical surface 12. Positioned on the surface 12 at the location where the main is to be tapped is a gasket 13.

A tapping valve is referred to in its entirety by the reference character T. The tapping valve T includes a metallic casing having a flanged base 14 which is positioned over the gasket 13. A saddle or stirrup (not illustrated) is employed to clamp the base 14 to the main 10 in accordance with well-known practice.

Immediately above the base 14, the casing is formed with a lateral extension 15 which is employed to effect the house connection after the main is tapped. During the tapping operation, the end of the extension 15 is closed by a cap 16 which holds the end seal 17 in closing position.

Extending radially outwardly from the outer side of the extension 15 is a radial extension 18 formed with a radial threaded passage 19. Received in this passage 19 is the tapping tool comprising a threaded shank 20 and a cutting bit 21. The tool is formed with an annular flange 23 which is integral with the tool. This flange 23 is intended to support and retain the innermost gasket in position a pair of gaskets 24 and 25. The gasket 24 is identified as the innermost gasket and is intended to seal the formed hole in the main. The gasket 25 is the outermost gasket and is intended to seal the inner end of the passage 19.

The outer end of the radial extension 18 is externally threaded as indicated at 26 and these threads are adapted to receive a cap 27.

*Operation*

The tapping valve T is mounted on the main 10 by stirrups as above mentioned. Moreover, the end plate 17 is in position closing the lateral extension 15. The cap 27 is removed and a wrench applied to the socket 22 to rotate the tool. The bit 21 cuts a hole in the cement asbestos main 10 and the formed hole is represented at 28. After the hole 28 is formed the radially inward progress of the tool is continued to move the innermost gasket 24 into position sealing the formed hole 28.

The house connection is now effected in accordance with well-known practice by stabbing the pipe constituting the connection after the end seal 17 is removed. The tool is now retracted and this movement withdraws the gasket 24 from its position sealing the formed hole 28 and moves the gasket 25 into position sealing the inner end of the passage 19. The tool is left in this position and the cap 27 again applied. Water will now flow through the formed hole 28 and radial extension 15 to the house connection.

While preferred specific embodiments of the invention are hereinbefore set forth, it is to be clearly understood that the invention is not to be limited to the exact constructions, materials, and devices illustrated and described because various modifications of these details may be provided in putting the information into practice within the purview of the appended claims.

What is claimed is:

1. A water main tapping and valve fitting comprising a hollow casing having a portion provided with an underside adapted to be fixed in a fluid-tight condition on a pipe to be tapped and providing a valve chamber having an opening radially inwardly at said underside, said casing having a radially directed internally threaded passage opposite said opening and in communication with said chamber and a laterally directed house extension in direct communication with said chamber between said passage and opening for selectively connecting another pipe thereto; a tapping tool having a threaded shank portion received in said internally threaded passage and having a cutting bit at an inward end, said tapping tool being mounted rotatable in said threaded passage for feeding advancement by the thread thereof axially inwardly against said pipe on which said casing portion is fixed and thereby effect the making of a hole therein to provide communication through said opening between said chamber and said pipe to be tapped, gasket means on said tool between said threaded shank portion and said cutting bit including a lower inwardly facing resilient gasket circumferentially of said tool and having of a transverse dimension less than that of said opening whereby it can be freely moved through said opening at the underside of the casing and seat directly against a surface of said pipe to be tapped circumferentially of said hole to conform thereto and seal off said hole produced therein, an upper gasket on said tool having a generally upwardly facing seating surface; and said casing having at a lower end of said internally threaded passage a seat engageable by said upper gasket to seal off the threaded passage when said tool is rotated in the opposite direction to withdraw said cutting bit from said hole through the threaded interengagement of said shank portion and said threaded passage.

2. A water main tapping and valve fitting comprising a hollow casing having a portion provided with an underside adapted to be fixed in a fluid-tight condition on a pipe to be tapped and providing a valve chamber having an opening radially inwardly at said underside, said casing having a radially directed internally threaded passage opposite said opening and in communication with said chamber and a laterally directed house extension in direct communication with said chamber between said passage and opening for selectively connecting another pipe thereto; a tapping tool having a threaded shank portion in said internally threaded passage and having a cutting bit at an inward end, said tapping tool being mounted rotatable in said threaded passage for feeding advancement by the thread thereof axially inwardly against said pipe on which said casing portion is fixed and thereby effect the making of a hole therein to provide communication through said opening between said chamber and said pipe to be tapped, gasket means on said tool between said threaded shank portion and said cutting bit and including an annular flange, a lower inwardly facing resilient annular gasket disposed circumferentially of said tool on the lower face of said flange and having a transverse dimension less than that of said opening whereby it can be freely moved through said opening at the underside of the casing and seat directly against a surface of said pipe to be tapped to conform thereto and seal off said hole produced therein, and an upwardly facing annular resilient gasket on the upper face of said flange, said casing having a seat engageable by said upper gasket to seal off said threaded passage, and said threaded tool being rotatable in the opposite direction for retraction away from said opening by threaded interengagement of said shank portion and said threaded passage to a position in which said upper gasket seats on said seat to seal said threaded passage and said tool is positioned clear of said hole thereby providing communication between said pipe to be tapped and said chamber.

3. A fitting according to claim 2, in which said tapping tool has an unthreaded shank portion between said threaded shank portion and said cutting bit, said threaded shank portion having a radius less than the cutting radius of said cutting bit, and in which said lower gasket is axially spaced from said cutting bit and has an inside radius less and an outside radius greater than the cutting radius of said cutting bit.

References Cited by the Examiner

UNITED STATES PATENTS

| | | | |
|---|---|---|---|
| 2,563,244 | 8/1951 | Holicer | 137—317 X |
| 3,045,512 | 7/1962 | Risley et al. | 77—38 |

FOREIGN PATENTS

| | | |
|---|---|---|
| 468,538 | 6/1927 | Germany. |
| 1,028,839 | 4/1958 | Germany. |

WILLIAM F. O'DEA, *Primary Examiner.*

ALAN COHAN, MARTIN P. SCHWADRON,
*Examiners.*

D. R. MATTHEWS, *Assistant Examiner.*